(12) United States Patent
Kato

(10) Patent No.: US 7,765,684 B2
(45) Date of Patent: Aug. 3, 2010

(54) CORRUGATED TUBE MOUNTING JIG

(75) Inventor: Hideyuki Kato, Gotenba (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/660,432

(22) PCT Filed: Aug. 8, 2005

(86) PCT No.: PCT/JP2005/014522

§ 371 (c)(1),
(2), (4) Date: Feb. 16, 2007

(87) PCT Pub. No.: WO2006/019002

PCT Pub. Date: Feb. 23, 2006

(65) Prior Publication Data

US 2007/0295947 A1    Dec. 27, 2007

(30) Foreign Application Priority Data

Aug. 16, 2004  (JP) ............................ 2004-236349

(51) Int. Cl.
*H01R 43/00* (2006.01)
*H02G 3/04* (2006.01)
(52) U.S. Cl. ............................ 29/749; 29/868; 29/869; 174/68.3
(58) Field of Classification Search ............ 29/745–51, 29/872, 868–69; 174/68.3; 285/154.1–154.3, 285/903
See application file for complete search history.

(56) References Cited

U.S. PATENT DOCUMENTS

| | | | | |
|---|---|---|---|---|
| 4,422,478 A | * | 12/1983 | Pentney et al. | 138/168 |
| 4,513,787 A | * | 4/1985 | Hegler et al. | 138/166 |
| 5,559,843 A | * | 9/1996 | Amiet et al. | 376/261 |
| 6,137,055 A | * | 10/2000 | Kawamura | 174/68.3 |
| 6,317,968 B1 | * | 11/2001 | Kawamura | 29/755 |
| 2004/0049913 A1 | * | 3/2004 | Dukes et al. | 29/868 |

FOREIGN PATENT DOCUMENTS

| | | | |
|---|---|---|---|
| JP | 7-245840 A | | 9/1995 |
| JP | 08-223736 A | | 8/1996 |
| JP | 09237530 A | * | 9/1997 |
| JP | 2000-059943 A | | 2/2000 |
| JP | 2002-291128 A | | 10/2002 |

* cited by examiner

*Primary Examiner*—A. Dexter Tugbang
*Assistant Examiner*—David P Angwin
(74) *Attorney, Agent, or Firm*—Sughrue Mion, PLLC

(57) ABSTRACT

A corrugated tube mounting jig 5 for mounting a corrugated tube C, having a slit S formed in a longitudinal direction, on a wire bundle W, has a higher flexibility at its distal end portion, and has a larger restoring force at the other portion. This corrugated tube mounting jig 5 includes a folded-back portion 51 of a generally U-shape for gripping the wire bundle W, side plate portions 52 which are continuous with the folded-back portion 51, and extend to be disposed respectively at opposite sides of the wire bundle W, and are arranged parallel to each other, and have respective end edges slanting relative to the wire bundle W, and a flange portion 53 which is formed at the slanting end edges of the side plate portions, and extends outwardly of the side plate portions 52. At least that portion of the folded-back portion 51 which defines its distal end portion with respect to a direction X of insertion of the corrugated tube C is made smaller in thickness than the other portion.

11 Claims, 4 Drawing Sheets

CORRUGATED TUBE MOUNTING JIG

TECHNICAL FIELD

This invention relates to a corrugated tube mounting jig.

BACKGROUND ART

A corrugated tube (or also called, for example, an overlap tube) has been used to cover a wire harness. An inner diameter of this corrugated tube is generally equal to an outer diameter of the wire harness, and a slit is provided along a centerline so as to insert the wire harness into the corrugated tube.

When inserting the wire harness into the corrugated tube having this slit, conventionally, the slit in the corrugated tube was opened with the hands, and the wire harness was inserted into the corrugated tube through the opened portion.

However, in the case of using a corrugated tube of a low flexibility, a large force was required since the slit was opened with the hands, and therefore there was encountered a problem that much time and labor were required for the operation.

Therefore, in order to overcome the above problem, there has been proposed a corrugated tube mounting jig 10 as shown in FIG. 4 (see Patent Literature 1).

This corrugated tube mounting jig 10 includes a gripping portion 18 which can be bent into a U-shape so as to grip a wire bundle W1, and a pair of bilaterally-symmetrical side plate portions 12, 12 continuous with this gripping portion 18, and the gripping portion 18 and the side plate portions 12, 12 are formed integrally with each other by a resin plate.

An edge 16 is formed at each side plate portion 12, 12, and extends in a direction obliquely intersecting the wire bundle W1 gripped by the gripping portion 18. A flange portion 15 which can be introduced into a slit S in a corrugated tube C1 is formed on and extends from the edge 16. Further, the flange portion 15 is divided into a multiplicity of sections having different widths so as to meet the use of a plurality of kinds of corrugated tubes C1 of different outer diameters.

In this corrugated tube mounting jig 10, the wire bundle W1 is fitted into the grip portion 18, and upper end portions of the flange portions 15 are fitted in the slit S in the corrugated tube C1, and in this condition the corrugated tube C1 is slid, and by doing so, the corrugated tube C1 can be fitted on the wire bundle W1.

However, the conventional corrugated tube mounting jig 10 (see FIG. 4) was formed to have a generally uniform thickness as a whole, and therefore had the following drawback.

Namely, the distal end portion of the corrugated tube mounting jig 10 is disposed in a position where the corrugated tube C1 is just about to be completely fitted on the wire bundle W1, and in this position the slit S in the corrugated tube C1 was wide opened, and in some case there was a fear that the corrugated tube C1 might be disengaged from the flange portions 15. Patent Literature 1: JP-A-2000-59943

DISCLOSURE OF THE INVENTION

Problem that the Invention is to Solve

This invention has been made in view of the above circumstances, and its object is to provide a corrugated tube mounting jig which can prevent a corrugated tube from being disengaged from a flange portion.

Means for Solving the Problem

The present invention provides a corrugated tube mounting jig for mounting a corrugated tube, having a slit formed in a longitudinal direction thereof, on a wire bundle which includes:

a folded-back portion which has a generally U-shape and grips the wire bundle;

side plate portions which are continuous with the folded-back portion, and extend to be disposed respectively at opposite sides of the wire bundle, and are arranged parallel to each other, and have respective end edges slanting relative to the wire bundle; and a flange portion which is formed at the slanting end edges of the side plate portions, and extends laterally of the side plate portions, wherein at least that portion of the folded-back portion which defines its distal end portion with respect to a direction of insertion of the corrugated tube is made smaller in thickness than the other portion.

In the corrugated tube mounting jig of this construction, the distal end portion of the folded-back portion is made smaller in thickness, and therefore the distal end portion has a higher flexibility. And, the other portion than the distal end portion is larger in thickness than the distal end portion, and therefore has a larger restoring force.

In the above corrugated tube mounting jig of the present invention, preferably, those portions of the side plate portions corresponding to the smaller-thickness portion of the folded-back portion are made smaller in thickness than the other portion.

In the corrugated tube mounting jig of this construction, the flexibility of the distal end portion can be made higher.

ADVANTAGE OF THE INVENTION

In the present invention, at least the distal end portion of the folded-back portion has a higher flexibility, and therefore even when the slit in the corrugated tube is wide opened in a position where the corrugated tube is just about to be fitted on the wire bundle, the distal end portion of the folded-back portion is inwardly deformed by the resiliency of the corrugated tube, so that the slit can be prevented from being unduly opened. Therefore, the corrugated tube can be prevented from being disengaged from the flange portion.

And besides, the other portion than the distal end portion of the folded-back portion has the larger thickness, and therefore has a larger restoring force. Therefore, the handleability is good, and it is possible to withstand the repeated use.

Figure 1:
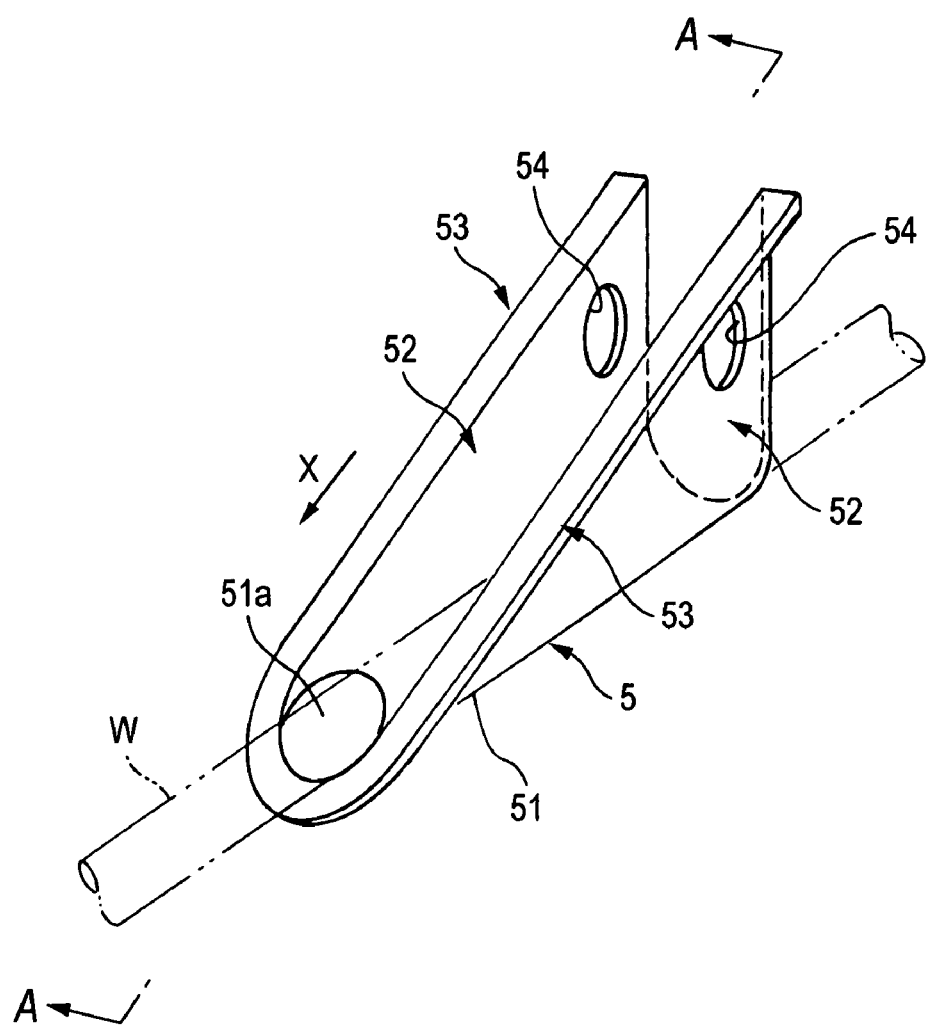
FIG. 1 is a perspective view showing an embodiment of the present invention.

DESCRIPTION OF THE REFERENCE NUMERALS AND SIGNS 5, 10 corrugated tube mounting jig
11 bottom portion 12, 52 side plate portion
15, 53 flange portion
16 edge
18 gripping portion
51 folded-back portion
51a smaller-thickness portion
52 side plate portion
53 flange portion
54 hole
C, C1 corrugated tube
S slit
W, W1 wire bundle

FOR CARRYING OUT THE INVENTION

One embodiment of a corrugated tube mounting jig of the present invention will now be described in detail with reference to the drawings.

FIG. 1 shows one embodiment of the corrugated tube mounting jig of the present invention, that is, the corrugated tube mounting jig 5. This corrugated tube mounting jig 5 includes a folded-back portion 51 of a generally U-shape for gripping a wire bundle W, side plate portions 52, 52 which are continuous with this folded-back portion 51, and extend respectively from both sides of the folded-back portion 51 in parallel relation to each other, and are disposed respectively at opposite sides of the wire bundle W, and a flange portion 53 which is formed at end edges of the side plate portions 52, 52 slanting relative to the wire bundle W, and extends laterally from the end edges of the side plate portions 52 and 52.

The flange portion 53 is formed to be extended around a distal end of the folded-back portion 51. And, holes 54, 54 which are used when carrying the jig or on other occasions are formed through the side plate portions 52, 52, respectively. The side plate portion 52 is formed into a generally triangular shape.

Furthermore, in the corrugated tube mounting jig 5 of the present invention, a smaller-thickness portion 51a is formed at least at that portion of the folded-back portion 51 which defines its distal end portion with respect to a direction X of insertion of the corrugated tube C.

Figure 2:
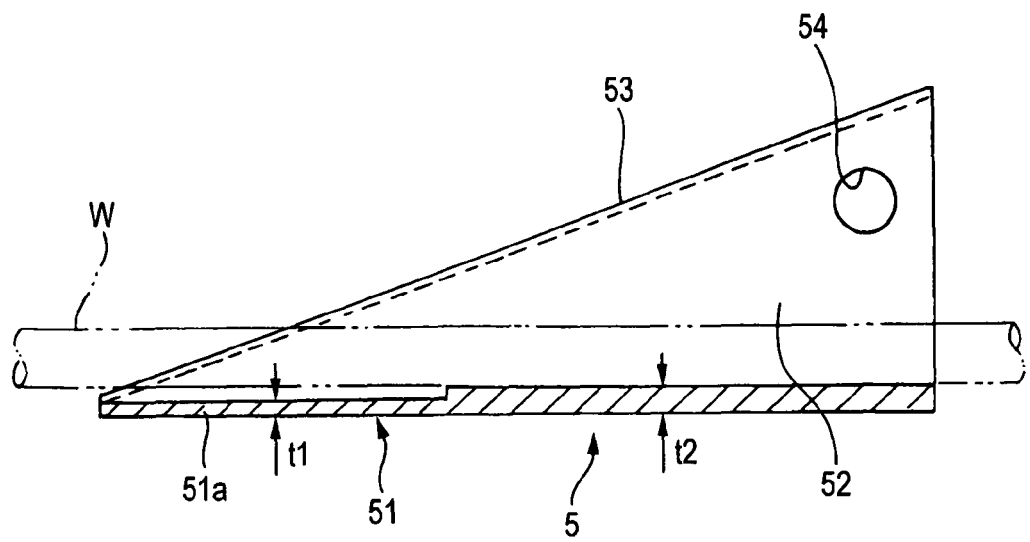
FIG. 2 is a cross-sectional view taken along the line A-A of FIG. 1.

As shown in FIG. 2, a thickness t1 of the smaller-thickness portion 51a is smaller than a thickness t2 of the other portion.

Figure 3:
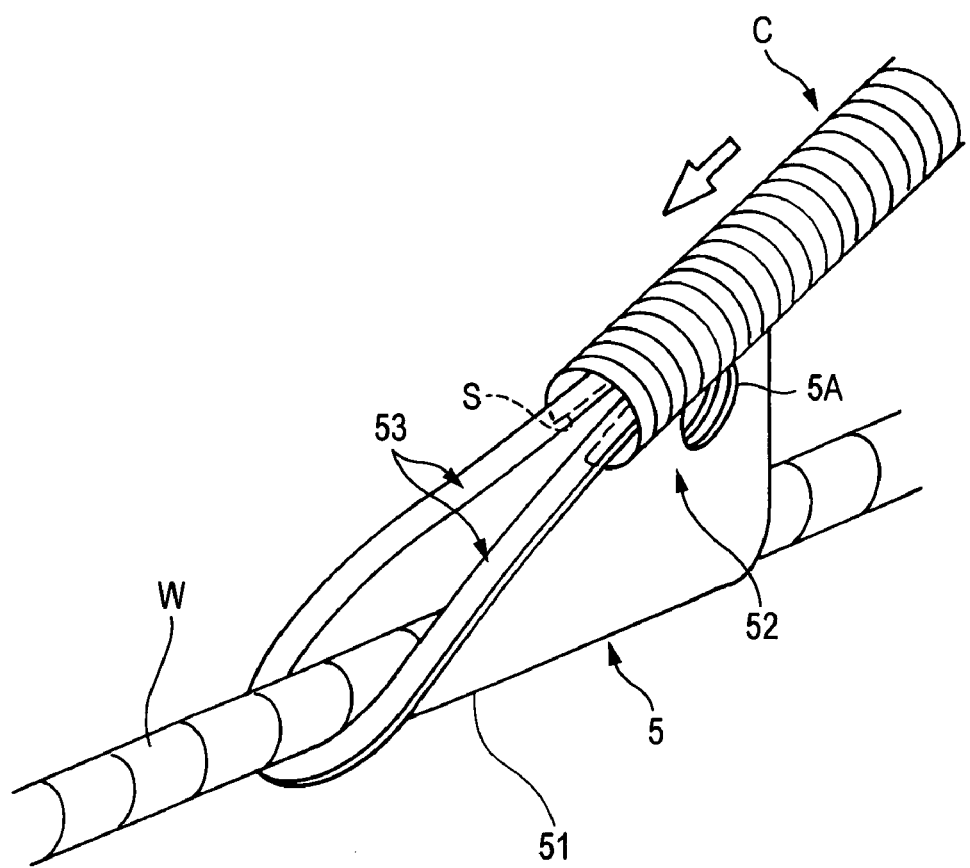
FIG. 3 is a perspective view showing an operation of the embodiment of the present invention.
Figure 4:
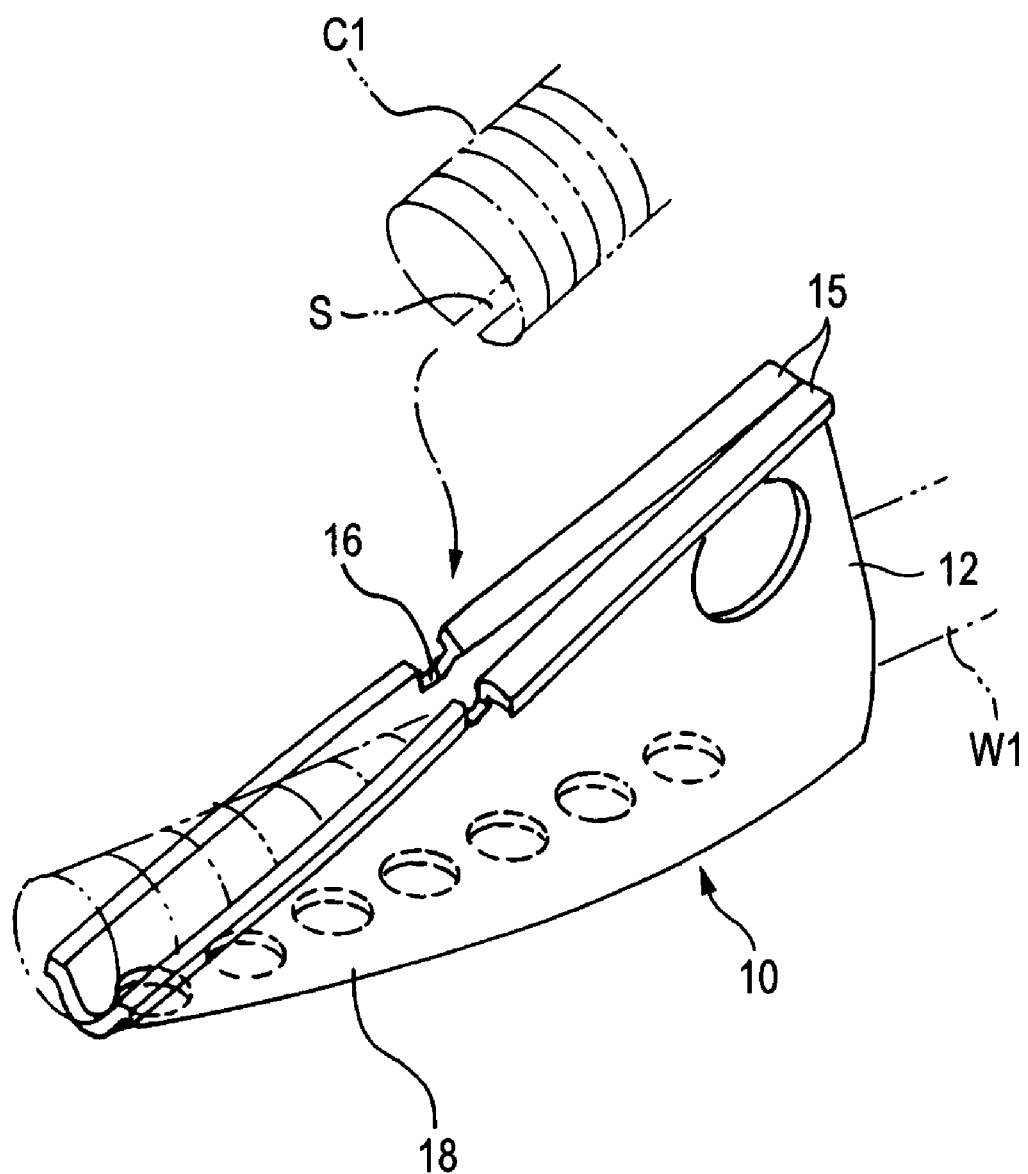
FIG. 4 is a perspective view showing a conventional corrugated tube mounting jig.

When this corrugated tube mounting jig 5 is to be used, the wire bundle W is gripped by the folded-back portion 51, and upper end edges of the flange portion 53 are fitted into the slit S as shown in FIG. 3. As a result, a gap between the opposite flange portions 53, 53 is reduced by the corrugated tube C.

Then, in this condition, the corrugated tube C is slid downward along the flange portions 53, 53. When a distal end of the corrugated tube C approaches the wire bundle W to a certain degree, the amount of deformation of the side plate portions 52, 52 decreases, and the gap between the flange portions 53, 53 will not become smaller than a certain dimension, and the slit S in the corrugated tube C is in turn gradually expanded.

When the corrugated tube C is further advanced in a direction toward the wire bundle W, the wire bundle W is inserted relative to the corrugated tube C, that is, into the interior of the corrugated tube C through the slit S, so that the wire bundle W is gradually covered with the corrugated tube C over an entire circumference thereof.

When the corrugated tube C is still further advanced along the flange portions 53, 53, so that the corrugated tube C is completely separated from the corrugated tube mounting jig 5, a predetermined range of the wire bundle W is completely covered with the corrugated tube C.

Thus, in the corrugated tube mounting jig 5 of the present invention, the smaller-thickness portion 51a is formed at least at the distal end portion of the folded-back portion 51 with respect to the direction X of insertion of the corrugated tube C, and therefore the flexibility thereof is higher.

Therefore, even when the slit S in the corrugated tube C is wide opened in a position where the corrugated tube C is just about to be fitted on the wire bundle W, the smaller-thickness portion 51a of the folded-back portion 51 is inwardly deformed in a relatively large amount by the resiliency of the corrugated tube C, so that the slit S can be prevented from being excessively opened.

Therefore, the corrugated tube C can be prevented from being disengaged from the distal end portion of the corrugated tube mounting jig 5.

Furthermore, the other portion than the distal end portion of the folded-back portion 51 is relatively thick, and therefore has a larger restoring force. Therefore, when fitting the corrugated tube C on the flange portions 53, 53 and when advancing the corrugated tube C along the flange portions 53, 53, these operations can be effected easily. And besides, it is possible to withstand the repeated use.

In the above embodiment, although the distal end portion of the folded-back portion 51 is reduced in thickness, those portions of the side plate portions 52, 52 corresponding to the smaller-thickness portion 51a can be made smaller in thickness than the other portion.

Although the present invention has been described in detail with reference to the specific embodiment, it is clear to those skilled in the art that various changes and modifications can be added without departing from the spirits and scope of the present invention.

This Application is based on Japanese Patent Application (Patent Application 2004-236349) filed on Aug. 16, 2004, and contents of which are incorporated herein as a reference.

The invention claimed is:

1. A corrugated tube mounting jig for mounting a corrugated tube, having a slit formed in a longitudinal direction, on a wire bundle, the corrugated tube mounting jig comprising:
   a folded-back portion that has a generally U-shape and that grips the wire bundle;
   side plate portions,
      which extend from the U-shape of the folded-back portion,
      which are connected to the U-shape of the folded-back portion for substantially the entire length of the folded back portion,
      which are disposed respectively on opposite sides of the wire bundle, and
      which are arranged parallel to each other, and which have respective end edges slanting relative to the wire bundle; and
   a flange portion that is formed at the slanting end edges of the side plate portions, and extends laterally of the side plate portions,
   wherein the folded-back portion has a distal end portion and a proximal end portion relative to a location of insertion of the corrugated tube onto the corrugated tube mounting jig, and
   wherein a material thickness of the distal end portion is made smaller than a material thickness of the proximal end portion.

2. The corrugated tube mounting jig according to claim 1, wherein parts of the side plate portions corresponding to the distal end portion of the folded-back portion are made smaller in material thickness than the side plate portions corresponding to the proximal end portion of the folded-back portion.

3. The corrugated tube mounting jig according to claim 1, wherein said wire bundle is in contact with at least a portion of the folded-back portion.

4. The corrugated tube mounting jig according to claim 1, wherein the at least the distal end portion comprises a bottom wall of the folded-back portion.

5. The corrugated tube mounting jig according to claim 1, wherein the flange portion extends substantially the entire length of the slanting edges of the side plate portions.

6. The corrugated tube mounting jig according to claim 1, wherein the flange portion is configured to engage with the slit of the corrugated tube.

7. The corrugated tube mounting jig according to claim 1, wherein the flange portion is acutely angled with respect to the wire bundle.

8. The corrugated tube mounting jig according to claim 1, wherein the side plate portions are disposed between the folded back portion and the flange portion.

9. The corrugated tube mounting jig according to claim 1, wherein the distal end portion of the folded-back portion is made smaller in material thickness in an extending direction of the side plate portions than the proximal end portion of the folded-back portion.

10. A corrugated tube mounting jig according to claim 1, wherein the side plate portions extend from the U-shape of the folded-back portion for the entire length of the folded back portion.

11. The corrugated tube mounting jig according to claim 1, wherein the distal end portion of the folded-back portion is inwardly deformed in a larger amount than the proximal end portion of the folded-back portion when the corrugated tube is slid along the flange portion.

* * * * *